May 23, 1939.  J. F. CULLIN  2,159,885
BATTERY CHARGING APPARATUS
Filed Sept. 26, 1936
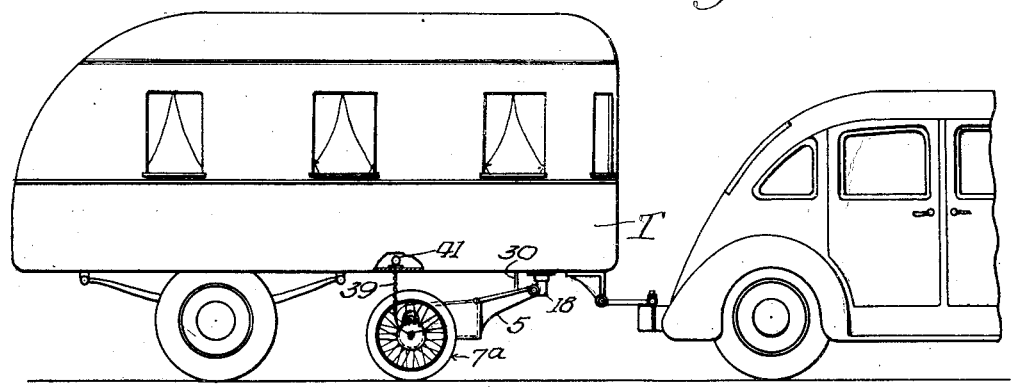
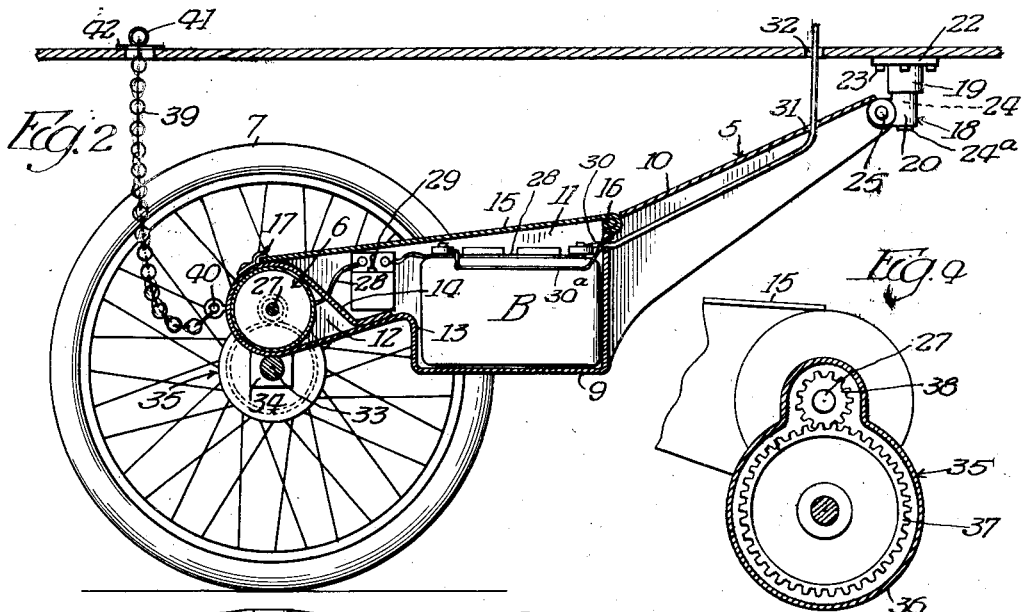
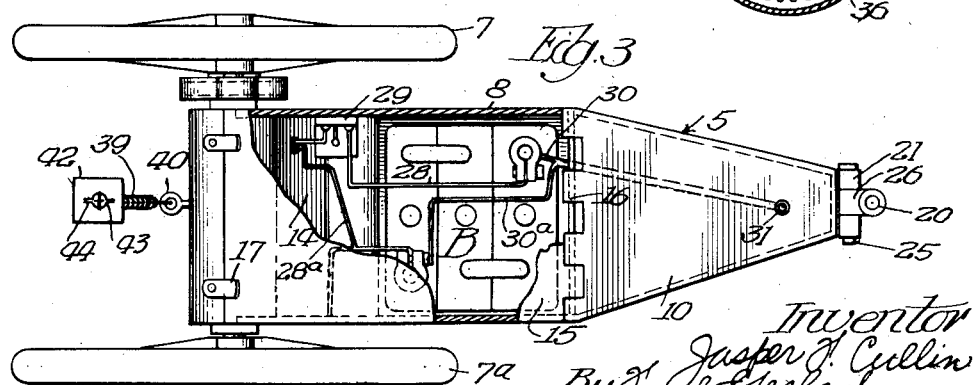

Patented May 23, 1939

2,159,885

UNITED STATES PATENT OFFICE 2,159,885

BATTERY CHARGING APPARATUS

Jasper F. Cullin, Detroit, Mich., assignor, by direct and mesne assignments, to Lou Mervis, Chicago, Ill.

Application September 26, 1936, Serial No. 102,650

1 Claim. (Cl. 171—313)

The present invention relates generally to charging apparatus. More particularly the invention relates to that type of charging apparatus which is adapted to charge a storage battery and comprises a generator and driving means for the generator.

One object of the invention is to provide a charging apparatus of this type which is particularly adapted for use in connection with an automobile trailer having a storage battery for supplying the various electrical appliances thereof with current and comprises an arm which is adapted to underlie and extend lengthwise of the trailer and embodies at the front end thereof a bracket for attachment to the bottom of the trailer and at its other or rear end a compartment for the generator and also a wheel which is adapted to travel on the ground or road and is connected to the generator so that during travel of the trailer it operates to drive the generator for battery charging purposes.

Another object of the invention is to provide a battery charging apparatus of the last mentioned character in which the bracket at the front end of the arm is of such character that the arm is permitted to swing sidewise as well as vertically and the ground wheel is thus adapted to accommodate itself to any unevenness in the road or ground over which it travels.

A further object of the invention is to provide a charging apparatus of the type and character under consideration in which the arm embodies a compartment for retaining the storage battery and has means whereby it, together with the ground wheel, may be raised when it is desired to eliminate charging of the battery while the trailer with which the apparatus is used is in motion.

A still further object of the invention is to provide a battery charging apparatus which is generally of new and improved construction, may be manufactured at a low and reasonable cost, and is capable of being readily installed.

Other objects of the invention and the various advantages and characteristics of the present battery charging apparatus will be apparent from a consideration of the following detailed description.

The invention consists in the several novel features which are hereinafter set forth and are more particularly defined by the claim at the conclusion hereof.

In the drawing which accompanies and forms a part of this specification or disclosure and in which like numerals of reference denote corresponding parts throughout the several views:

Figure 1 is a side view of a trailer having a battery charging apparatus embodying the invention applied thereto;

Figure 2 is a vertical longitudinal sectional view of the apparatus, illustrating in detail the construction and character of the arm and showing the manner in which the arm is attached to the trailer bottom;

Figure 3 is a plan view of the apparatus, parts being broken away and shown in section for purposes of illustration; and Figure 4 is a detail sectional view of the gearing between the ground wheel and the armature of the generator.

The apparatus which is shown in the drawing constitutes the preferred embodiment of the invention. It is in the nature of an attachment or accessory device and is adapted primarily to charge a storage battery B for supplying current to the various electrical appliances of an automobile trailer T. The trailer is shown in the drawing as being of conventional design and embodies a pair of supporting wheels at the rear end and a bracket at its front end whereby it may be attached to the rear end of an automobile.

The apparatus for charging the battery B of the trailer T comprises at the main or essential parts thereof an arm 5, a generator 6, and a pair of ground wheels 7 and 7ª. The arm 5 is disposed beneath and extends lengthwise of the trailer T and consists of a pair of sides 8, a bottom 9, and a top 10. The sides are formed of any suitable material such as plate or sheet metal and are connected to and held in laterally spaced relation by the bottom 9 and the top 10. The bottom 9 is formed of the same material as the sides and forms with the sides and the top a front compartment 11 for the storage battery B and a rear compartment 12 for the generator 6. The front end of the bottom 9 terminates inwardly of the front ends of the sides 8 and is bent upwards at right angles, as shown in Figure 2, so that it forms a closure for the front of the compartment 11. The rear end of the bottom 9 of the arm embodies an upstruck part 13 for holding the battery B within the compartment 11 and is bent upwards at its rear extremity in order to close the rear portion of and form a back wall for the generator compartment 12. The front portion of the generator compartment is defined by means of a plate 14 which extends between and is secured to the rear ends of the sides 8 of the arm. The top 10 is coextensive with the sides and includes as a part thereof a plate 15. This plate forms a cover for the battery compartment 11 and is connected by a hinge 16 to the upper margin of the upstanding front end of the bottom 9 of the arm so that it may be swung upwards into an open position wherein it permits of access to the battery B. Spring fasteners 17 on the upper extremity of the rear end of the bottom 9 serve to secure the cover forming plate 15 in its closed position. The front end of the arm 5 is connected to the front portion of the bottom of the trailer by means of a bracket 18. This bracket comprises a base member 19, a collar 20, and a pair of sleeves 21. The base member 19 is provided at the top thereof with an out-turned marginal flange 22 and is fixedly secured to the trailer bottom by means of bolts 23 which extend through holes in the flange. A vertically extending pintle 24 is fixed to and depends from the lower portion of the base member 19 and embodies a head 24a at its lower end. The collar 20 surrounds and is rotatable about the pintle and is held against axial displacement by the base member and the head of the pintle. The sleeves 21 are welded or otherwise fixedly secured to the front end portions of the sides 8 of the arm 5. They are positioned in laterally spaced relation on the ends of a horizontally extending stud 25 which extends through and is secured in a rearwardly extending lug 26 on the collar 20. Due to the fact that the collar is rotatable about the vertically extending pintle and the sleeves are rotatable about the horizontally extending stud the bracket permits the arm 5 to swing horizontally and also vertically.

The generator 6 is confined in the compartment 12 between the plate 14 and the rear end portion of the bottom 9 of the arm 5 and comprises field coils (not shown) and an armature (also not shown). The armature is rotatably supported by means of a shaft 27 and is driven as hereinafter described by the wheel 7. Conductors 28 and 28a extend between and serve to connect the battery and the generator. The conductor 28 includes a cutout or circuit breaker for disconnecting the battery from the generator when the battery ceases to charge. It is connected at one end to one terminal of the battery B and at its other end to one of the commutator brushes (not shown) of the generator. The conductor 28a is connected to and extends between the other commutator brush and the other terminal of the battery B. Current is supplied from the battery B to the various electrical appliances within the trailer T by means of a pair of conductors 30 and 30a. These conductors are connected to the terminals of the battery respectively and extend forwardly under the front portion of the top 10 of the arm 5 and then pass upwards through a hole 31 in the arm top 10 and a hole 32 in the bottom of the trailer.

The ground wheels 7 and 7a serve to support the rear end of the arm 5 and are preferably in the form of bicycle wheels. They have rubber tires of the pneumatic variety on the rims thereof and are loosely mounted on the ends of the axle 33. The latter extends horizontally beneath the rear portion of the bottom 9 of the arm 5 and is fixedly secured to brackets 34 which depend from and are secured to the rear ends of the sides 8 of the arm. During travel of the trailer T the wheels 7 and 7a are adapted to run on the ground or roadway. The wheel 7 is connected to drive the generator for current generating purposes through the medium of a speed increasing unit 35. This unit comprises a housing 36 which surrounds the inner portion of the hub of the wheel 7 and also encloses one end of the armature shaft 27. The unit also comprises a gear 37 and a pinion 38. The gear 37 is fixed to the hub of the wheel 7 and meshes with and serves to drive the pinion 38. The pinion, as shown in Figure 4, is fixedly secured to the end of the armature shaft which projects into the housing 36. When the wheel 7 is in contact with the ground and revolves as the result of travel of the trailer the armature of the generator is rotated and the current generated by the generator is conducted to the battery B for charging purposes. The wheel 7a is in the nature of an idler wheel and assists the wheel 7 in supporting the rear end of the arm 5. By reason of the fact that the arm is permitted by the bracket 18 to swing horizontally and also vertically the ground wheels 7 and 7a are free to accommodate themselves to any unevenness in the road or ground over which they travel. Because the battery B is contained in the compartment 11 the arm is sufficiently heavy so that proper traction is afforded between the ground wheels and the subjacent roadway. The arm 5 is comparatively narrow and is connected by the bracket 19 to the trailer bottom so that it is centrally disposed with respect to the trailer. The axle 33 is in the nature of a stub axle with the result that the ground wheels 7 and 7a are positioned in close proximity to one another between the main supporting wheels of the trailer T.

In addition to the arm 5 the generator 6 and the ground wheels 7 and 7a the apparatus comprises a chain 39. This chain is connected at one of its ends to an eye 40 on the upwardly extending rear extremity of the bottom 9 of the arm 5 and is adapted to be raised and locked in place in order to hold the ground wheels out of engagement with the ground at the completion of a charging operation or when it is desired not to drive or operate the generator 6. The other or upper end of the chain 39 is provided with a finger ring 41 and extends through a plate 42 on the bottom of the trailer T. The plate, as shown in Figure 3, has a central hole 43 through which the chain extends and embodies a radially extending slot 44 into which one of the links of the chain may be slid in order to lock the chain against vertical movement relatively to the plate. When it is desired to raise the wheels out of engagement with the ground in order to render the generator inoperative the ring 41 is gripped and moved sidewise until the chain registers with the hole 43 on the plate 42. Thereafter by manipulation of the ring the chain is raised to proper height and is then shifted laterally in order to engage one of the links with the slotted portion of the plate.

The operation of the apparatus is as follows: When the trailer is in forward motion as the result of being towed and it is desired to charge the battery B the chain 39 is lowered until the ground wheels 7 and 7a contact with the subjacent roadway. As soon as the ground wheels come in contact with the roadway they rotate about the axle 33. During rotation of the wheel 7 the speed increasing unit 35 operates to drive the armature of the generator and results in the generator supplying current to the battery B for charging purposes. When it is desired to inspect the battery B or put water in it, it is only necessary to raise the cover forming plate 15. Due to the looseness of the chain 39 the arm 5 may be swung sidewise into a position wherein the plate 15 is readily accessible.

The herein described charging apparatus consists of but a small number of parts and hence may be manufactured at a low and reasonable cost. It is adapted to be sold as a trailer attachment and may be installed simply by attaching the bracket 18 to the trailer bottom and running the conductor 30 and the chain 39 through holes in the trailer bottom.

The invention is not to be understood as restricted to the details set forth, since these may be modified within the scope of the appended claim, without departing from the spirit and scope of the invention.

Having thus described the invention, what I claim as new and desire to secure by Letters Patent is:

In combination with a vehicle having carrying wheels for supporting it and equipped with a storage battery, an apparatus for charging the battery comprising a generator connected to supply current to the battery, an arm with compartments therein for the battery and the generator, disposed beneath and extending lengthwise of the vehicle and connected at the front end thereof to a bracket on the vehicle bottom so that it is free to swing vertically relatively to the vehicle, a wheel on an axle at the rear end of the arm, adapted when said arm is in a lowered position to travel on and be rotated by traction with the road and connected to drive the generator, and readily releasable means including a flexible connection at said rear end of the arm for holding the arm in a raised position out of contact with the road.

JASPER F. CULLIN.

CERTIFICATE OF CORRECTION.

Patent No. 2,159,885. May 23, 1939.

JASPER F. CULLIN.

It is hereby certified that the above numbered patent was erroneously issued to Lou Mervis, as assignee, by direct and mesne assignments, of the entire interest in said invention, whereas said Letters Patent should have been issued to the inventor, Jasper F. Cullin and Lou Mervis, of Chicago, Illinois, said "Mervis" being assignee, by direct and mesne assignments, of two-thirds interest in said invention, as shown by the record of assignments in this office; and that the said Letters Patent should be read with this correction therein that the same may conform to the record of the case in the Patent Office.

Signed and sealed this 11th day of July, A. D. 1939.

Henry Van Arsdale (Seal) Acting Commissioner of Patents.

CERTIFICATE OF CORRECTION.

Patent No. 2,159,885. May 23, 1939.

JASPER F. CULLIN.

It is hereby certified that error appears in the above numbered patent requiring correction as follows: In the grant, line 13, for "Lou Mervis, her heirs" read Jasper F. Cullin and Lou Mervis, their heirs, and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.